United States Patent [19]

Ammann et al.

[11] Patent Number: 4,760,702
[45] Date of Patent: Aug. 2, 1988

[54] SUPERCHARGED MARINE DIESEL ENGINE

[75] Inventors: Hansrudolf Ammann, Oberentfelden; Hans J. Egger, St. Gallen; Adrian Streuli, Schinznach-Bad, all of Switzerland

[73] Assignee: BBC Brown, Boveri & Company, Limited, Baden, Switzerland

[21] Appl. No.: 13,556

[22] Filed: Feb. 11, 1987

[30] Foreign Application Priority Data

Feb. 27, 1986 [CH] Switzerland ............... 793/86

[51] Int. Cl.$^4$ .............................................. F02B 37/00
[52] U.S. Cl. ..................... 60/605.2; 60/606; 60/624
[58] Field of Search ............... 60/597, 598, 605, 606, 60/624; 290/52

[56] References Cited

FOREIGN PATENT DOCUMENTS

| 941235 | 4/1956 | Fed. Rep. of Germany | 60/606 |
| 2001390 | 3/1983 | German Democratic Rep. | 290/52 |
| 3638 | 1/1979 | Japan | 60/624 |
| 156918 | 12/1979 | Japan | 60/606 |
| 457813 | 2/1975 | U.S.S.R. | 60/624 |

Primary Examiner—Michael Koczo
Attorney, Agent, or Firm—Oblon, Fisher, Spivak, McClelland & Maier

[57] ABSTRACT

In a supercharged marine diesel engine having at least one exhaust-gas turbocharger (6, 7) and a separate utility turbine (12) which is connected in parallel with the supercharging turbine (7) and delivers power, and having at least one auxiliary diesel engine (10) which is supercharged by means of a turbocharger and which drives a synchronous generator (11) supplying the ship's electrical system with electrical energy, the utility turbine (12) is coupled to a free shaft end of the auxiliary diesel/generator unit (10, 11). In this way, the auxiliary diesel engine (10) can be relieved of load, which results in a considerable fuel saving. In order to maintain a positive scavenging gradient when the auxiliary diesel engine (10) is relieved of load, a small portion of the exhaust gases of the marine diesel engine (2) is conveyed to a point upstream of the supercharging turbine (19) of the auxiliary diesel engine (10).

6 Claims, 1 Drawing Sheet

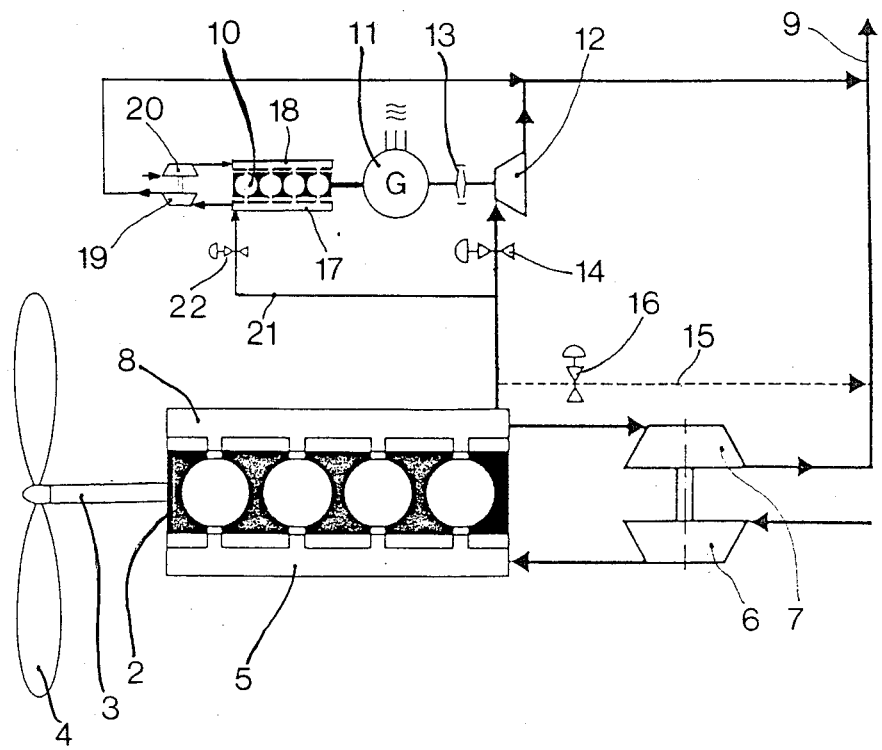

SUPERCHARGED MARINE DIESEL ENGINE

FIELD OF THE INVENTION

The invention relates to a supercharged marine diesel engine
having at least one exhaust-gas turbocharger and a separate utility turbine which is connected in parallel with the supercharging turbine and delivers power,
and having at least one supercharged auxiliary diesel engine which drives a synchronous generator supplying the ship's electrical system with electrical energy,
with the utility turbine being coupled to a free shaft end of the auxiliary diesel/generator unit.

BACKGROUND OF THE INVENTION

Marine diesel engines in which the utility turbine is used for generating the electrical energy required on the ship are known.

Thus, for example, a generator can be coupled directly to the reduction gearing of the high-speed utility turbine. A unit of this type has the advantage that it can be accommodated somewhere in the freely available space of the ship's engine room provided the gas lines are not too long. The disadvantage of this solution is in the need for elaborate power electronics with which the turbine/generator unit is to be regulated to a specified speed. The fact that controls of this type cost several times the price of the turbine eliminates them from the restricted choice. Using economical asynchronous generators, which is actually the most obvious solution, is also ruled out, because, in marine installations, in contrast to stationary installations—in which a generally large electrical power system keeps the turbine/generator unit at a constant speed—the entire output of the ship's electrical system is approximately of the order of magnitude of the utility turbine output; the ship's electrical system is therefore unable to keep the speed of a utility turbine/asynchronous generator constant.

No more useful is a further method of speed control in which a synchronous generator is coupled to the utility turbine and this unit is regulated by means of valves in the exhaust gas. The problem here, in particular, is the costly arrangement of controllable valves in the exhaust gas flow of installations run on heavy oil, and also the dynamic processes in the long exhaust-gas lines, which processes can be difficult to monitor.

Another possibility of using the utility turbine for the generation of current lies in marine diesel engines which themselves drive a speed-controlled generator. Here, the utility turbine can be coupled to the free shaft end of this generator. However, as a result of the costly speed control, many marine engines are not equipped with a separate generator. As a rule, provision is then made for the utility turbine output to be delivered to the crankshaft of the main engine via likewise costly gearing.

A supercharged marine diesel engine of the type mentioned at the beginning (that is, in which the utility turbine is coupled to a free shaft end of the auxiliary diesel/generator unit) is described in the journal "HANSA-Schiffahrt-Schiffbau-Hafen", 122nd year—1985, No. 22, pages 2304–2310. This solution, designated as a complete integrated system, has the advantage that the power requirement can be met in the most simple, inexpensive and reliable manner, with it being possible to dispense with all of the abovementioned auxiliary generators, gearing and control devices.

However, when a turbocharged diesel engine is at low load (the pressure difference across the engine, that is, the difference between the pressures in the exhaust manifold and in the air receiver) is very small. It can even be sometimes negative. Since, however, reciprocating engines always have a certain valve overlap (that is, phases in which the inlet valves and the exhaust valves are open at the same time) combustion gases can flow back into the inlet ports when there is a negative pressure difference across the engine. The inlet ports can become severely contaminated, especially in heavy-oil operation, in which the combustion gases contain many particles of dirt.

OBJECT OF THE INVENTION

The object of the invention, in a marine installation of the type mentioned at the beginning, is thus to ensure that the pressure difference across the auxiliary diesel engine is always positive down to the lowest loads.

SUMMARY OF THE INVENTION

This is achieved according to the invention by feeding a small portion of the exhaust gases of the marine diesel engine into the exhaust-gas system on the inlet side of the supercharging turbine of the auxiliary diesel engine.

BRIEF DESCRIPTION OF THE DRAWING

An exemplary embodiment of the invention is diagrammatically shown in the drawing, wherein the flow direction of the working media is designated by arrows.

DETAILED DESCRIPTION OF THE PRESENTLY PREFERRED EMBODIMENT

The considerably simplified marine installation, in which elements not essential to the invention (such as, for example, the hull) have been omitted, shows a multicylinder marine diesel engine, designated below as the main diesel 2 having an exhaust manifold 8. A fixed pitch propeller 4 is directly driven via a shaft 3. The main diesel 2 receives compressed air from an air receiver 5, in which the air is conveyed by a compressor 6 of an exhaust-gas turbo-charger. The compressor 6 is driven by a supercharging turbine 7, which is charged with the exhaust gases from the exhaust manifold 8 of the main diesel 2. After expanding, the exhaust gases are expelled to the atmosphere via an exhaust 9 and a funnel.

A multicylinder auxiliary diesel 10 which drives a synchronous generator 11 is provided for supplying the ship's electrical power. For this purpose, the speed of the auxiliary diesel 10 is regulated, for example to 1200 revolutions per minute. The auxiliary diesel 10 is also supercharged by means of an exhaust turbocharger. It receives an compressed air from the air receiver 18, the compressed air having been conveyed into the air receiver 18 by a compressor 20 of the turbocharger. The compressor 20 is coupled to a supercharging turbine 19 which is driven by an exhaust gases from the exhaust vessel 17. After releasing their energy, the exhaust gases are expelled.

The excess exhaust-gas energy from the main diesel 2 is fed to a utility turbine 12. The utility turbine 12 is flow-connected in parallel with the supercharging turbine 7; that is, it is also charged with hot exhaust gases from the exhaust manifold 8.

Like the auxiliary diesel 10, the utility turbine 12 is also used for generating electrical energy. For this purpose, it is coupled to a free shaft end of a functional unit consisting of the auxiliary diesel 10/synchronous generator 11. In the present example, the utility turbine 12 is coupled via a free-wheel coupling 13 on the generator side. Of course, it could just as easily be coupled on the engine side.

The utility turbine 12 can be shut off via an exhaust-gas valve 14. This means of stopping the utility turbine 12 is of particular importance in exhaust-gas turbochargers, the supercharging turbine 7 of which is designed for partial load. The supercharging turbine 7 is designed for partial load in such a way that the pressure in the exhaust manifold 8 is increased. In two-stroke engines and scavenged four-stroke engines, this can be done up to a pressure at which adequate scavenging is still ensured; this can extend almost into the supercharge pressure range. An increased pressure in the common exhaust manifold 8 is achieved by the turbine cross-section charged by the exhaust gases being reduced from 100% (in the case of a full-load design) to 80%. The result of this increased pressure is that a larger portion of the potential exhaust-gas energy can be utilized, because the choke losses from the cylinder to the common receiver are also reduced. In order to achieve the abovementioned supercharge pressure (that is, in order to produce the required compressor output) the supercharging turbine 7 no longer requires the energy supply available. The portion not required is used up in the utility turbine 12.

In such a case, in the parallel circuit shown of the utility turbine, the entire turbine area to be acted upon can be subdivided as follows: the supercharging turbine 7 accounts for 70% and the utility turbine 12 accounts for 10%.

With this measure, when the main diesel 2 is at full load, an improvement in consumption (that is, a fuel saving) of about 3% can be achieved despite an insignificant reduction in the power density (that is, in the mean specific pressures of 1 to 2%. Moreover, both the thermal and mechanical stresses in the main diesel do not become more disadvantageous compared with a full-load design (100% turbine area).

Shutting off the utility turbine 12, as mentioned above, at partial load leads to a reduction in the turbine area of 30% compared with the conventional 100% drop and to a reduction of about 10% compared with a utility turbine which cannot be shut off. This again increases the pressure in the common exhaust manifold 8 and consequently leads to a considerable increase in the supercharge pressure in the air receiver 5. This accordingly results in a further improvement in the specific fuel consumption in the partial load range.

In the event of the utility turbine 12 being stopped for another reason (that is, if the exhaust-gas valve 14 is closed) a blow-off line 15 with an emergency valve 16 is arranged between the feed line to the utility turbine 12 and the exhaust 9. Its narrowest cross-section is to be of a size corresponding to the turbine area of the utility turbine 12. This ensures that the supercharging turbine 7, even in emergency operation, only has to handle that quantity of gas for which it is designed.

The utility turbine 12 is a relatively small, high-speed turbine. Therefore, its 23,000 revolutions per minute, for example, have to be reduced via a gearing to the required 1200 revolutions per minute corresponding to 60 Hz. The lubricating circuit of the auxiliary diesel 10 can be used for lubricating the utility turbine 12 and the gearing.

The invention is described with reference to a realistic numerical example. Of course, only approximate figures can be given, since too many engine-specific and supercharger-specific parameters would rob the adsolute values of their significance:

A single-engine installation is located in a container ship with a direct propeller drive. The large two-stroke diesel used, with 12 cylinders, is assumed has a driving power of about 35,000 kW.

Such a ship requires an average of 1200 kW of electrical energy. The auxiliary installation feeding the ship's electrical system consists of three auxiliary diesel engines coupled in each case to a 1600 kW generator. One of the auxiliary diesels is in service to meet the required demand, a second auxiliary diesel runs on no load and a third auxiliary diesel is provided as a stand-by.

Three exhaust-gas turbochargers are provided for supplying the supecharged air. An isentropic compressor output of 8000 kW is required at a pressure of about 3.2 bar in the air receiver. At a compressor efficiency of 85%, about 9500 kW is applied to the three turbocharger shafts.

However, the output from the exhaust gases which can be achieved at present efficiencies is about 10,500 kW at a pressure of 3.0 bar. The excess supply of exhaust-gas energy is utilized in the utility turbine, so that about 1000 kW can be delivered by shaft to the functional unit of auxiliary diesel/generator.

Therefore of the 1200 kW of ship's power required, the auxiliary engine only needs to produce 200 kW. The auxiliary diesel engine therefore runs mainly at relatively low load. This increases the risk of contamination in the inlet ports.

To remedy this, a small portion of the exhaust gases from the exhaust manifold 8 of the main diesel 2 is delivered into the exhaust-gas system of the auxiliary diesel 10. For this purpose, in the example shown, a further feed line 21 branches from the feed line to the utility turbine, which feed line 21 leads into the exhaust vessel 17. With this measure, the scavenging gradient of the auxiliary diesel 10 can be considerably increased. If, for example, about 1% of the exhaust-gas quantity of the main diesel 2 is fed to the supercharging turbine 19 of the auxiliary diesel 10, this enables the supercharge pressure of the auxiliary diesel 10 to be increased by about 20%, which in every case leads to the desired, positive scavenging gradient.

Of course, the exhaust-gas quantity which is to be fed to the supercharging turbine 19 can be controlled as a function of the pressure difference across the auxiliary diesel 10. In this case, a control member 22, to be actuated accordingly, will be advantageously arranged in the feed line 21.

What is claimed:
1. Supercharged marine diesel engine (2):
   having at least one exhaust-gas turbocharger (6, 7) comprising a compressor (6) and a supercharging turbine (7) and a separate utility turbine (12) which is connected in parallel with the supercharging turbine (7) and delivers power,
   and having at least one auxiliary diesel engine (10) which drives a synchronous generator (11) supplying the ship's electrical system with electrical energy and which has at least one exhaust-gas turbocharger (19,20) comprising a compressor (20) and a supercharging turbine (19), with said separate utility turbine (12) being coupled to a free shaft end of the auxiliary diesel/generator unit (10, 11), a small portion of the exhaust gases of the marine diesel engine (2) being fed via a feed line (21) into the exhaust-gas system on the inlet side of said supercharging turbine of said auxiliary diesel engine (10).

2. Diesel engine according to claim 1, wherein the exhaust-gas portion is fed into an exhaust vessel (17) of said auxiliary diesel engine (10).

3. A marine diesel installation comprising:
 (a) a main diesel engine having an exhaust manifold and a first air receiver;
 (b) a first exhaust gas turbocharger comprising a first compressor and a first supercharging turbine;
 (c) a first path of fluid communication between said exhaust manifold of said main diesel engine and said first supecharging turbine;
 (d) a second path of fluid communication between said first compressor and said first air receiver;
 (e) an auxiliary diesel engine having an exhaust vessel and a second air receiver;
 (f) a second exhaust gas turbocharger comprising a second compressor and a second supercharging turbine;
 (g) a third path of fluid communication between said exhaust vessel of said auxiliary diesel engine and said second supercharging turbine;
 (h) a fourth path of fluid communication between said second compressor and said second air receiver;
 (i) a synchronous generator operatively connected to said auxiliary diesel engine;
 (j) a utility turbine operatively connected to said auxiliary diesel engine;
 (k) a fifth path of fluid communication between said exhaust manifold of said main diesel engine and said utility turbine; and
 (l) a sixth path of fluid communication between said exhaust manifold of said main diesel engine and said second supercharging turbine.

4. A marine diesel installation as recited in claim 3 wherein said sixth path of fluid communication comprises:
 (a) a first feed line leading from said fifth path of fluid communication to said exhaust vessel of said auxiliary diesel and
 (b) a second feed line leading from said exhaust vessel of said auxiliary diesel to said second supercharging turbine.

5. A marine diesel installation as recited in claim 4 and further comprising a control member located in said first feed line for controlling the throughput therethrough as a function of the pressure difference across said auxiliary diesel engine.

6. A marine diesel installation as recited in claim 3 and further comprising a control member located in said sixth path of fluid communication for controlling the throughput therethrough as a function of the pressure difference across said auxiliary diesel engine.

* * * * *